United States Patent
Gomez

(10) Patent No.: US 9,822,796 B2
(45) Date of Patent: Nov. 21, 2017

(54) GAS TURBINE COMPRESSOR STATOR VANE ASSEMBLY

(71) Applicant: MTU Aero Engines AG, Munich (DE)

(72) Inventor: Sergio Elorza Gomez, Munich (DE)

(73) Assignee: MTU Aero Engines AG, Munich (DE)

( * ) Notice: Subject to any disclaimer, the term of this patent is extended or adjusted under 35 U.S.C. 154(b) by 517 days.

(21) Appl. No.: 14/331,849

(22) Filed: Jul. 15, 2014

(65) Prior Publication Data

US 2015/0016986 A1 Jan. 15, 2015

(30) Foreign Application Priority Data

Jul. 15, 2013 (EP) ..................................... 13176499

(51) Int. Cl.
*F04D 29/54* (2006.01)
*F01D 9/04* (2006.01)
*F01D 5/14* (2006.01)

(52) U.S. Cl.
CPC .......... *F04D 29/544* (2013.01); *F01D 9/041* (2013.01); *F01D 5/141* (2013.01); *F05D 2220/3219* (2013.01); *F05D 2250/38* (2013.01); *F05D 2270/101* (2013.01); *Y02T 50/673* (2013.01)

(58) Field of Classification Search
CPC ........ F04D 29/38; F04D 29/54; F04D 29/542; F04D 29/544; F01D 5/14; F05D 2240/10
USPC .......................................................... 415/192
See application file for complete search history.

(56) References Cited

U.S. PATENT DOCUMENTS

| | | | | |
|---|---|---|---|---|
| 4,671,738 A | * | 6/1987 | Freeman | F04D 29/324 415/181 |
| 5,562,404 A | * | 10/1996 | Koff | F01D 5/145 415/173.7 |
| 5,779,443 A | * | 7/1998 | Haller | F01D 5/141 415/191 |

(Continued)

FOREIGN PATENT DOCUMENTS

| | | |
|---|---|---|
| DE | 697 21 114 | 2/2004 |
| EP | 0801230 | 10/1997 |

OTHER PUBLICATIONS

Lei, V.M. et al "A Criterion for Axial Compressor Hub-Corner Stall" Journal of Turbomachinery Jul. 2008, vol. 130/031006-1-10.*

*Primary Examiner* — Woody Lee, Jr.
*Assistant Examiner* — Topaz L Elliott
(74) *Attorney, Agent, or Firm* — Davidson, Davidson & Kappel, LLC

(57) ABSTRACT

A stator vane assembly for a compressor of a gas turbine, in particular of an aircraft engine, including a plurality of stator vanes whose airfoil sections form a stagger angle with an axis of rotation of the compressor, which stagger angle varies along a duct height of the stator vane assembly. Along the duct height from the inside to the outside, the stagger angle increases to a local maximum in a second section adjoining a first, radially innermost section, and decreases to an outer local minimum in a third section adjoining this second section and, along the duct height from the inside to the outside, the stagger angle decreases from the initial value to an inner local minimum in the first, radially innermost section and/or increases from the outer local minimum to a final value in a fourth, radially outermost section adjoining the third section.

21 Claims, 2 Drawing Sheets

(56) References Cited

U.S. PATENT DOCUMENTS

| | | | | |
|---|---|---|---|---|
| 5,947,683 A * | 9/1999 | Kobayashi | ............... | F01D 5/145 |
| | | | | 415/191 |
| 6,508,630 B2 * | 1/2003 | Liu | ................. | F01D 5/145 |
| | | | | 416/228 |
| 6,899,526 B2 * | 5/2005 | Doloresco | ............... | F01D 5/141 |
| | | | | 416/223 A |
| 8,127,444 B2 * | 3/2012 | Bladon | ................. | B23H 9/10 |
| | | | | 29/889.23 |
| 8,720,205 B2 * | 5/2014 | Lugg | ................. | F01D 5/03 |
| | | | | 60/767 |
| 9,303,656 B2 * | 4/2016 | Takahashi | ............. | F04D 29/324 |
| 2005/0031454 A1 | 2/2005 | Doloresco et al. | | |
| 2007/0126292 A1 * | 6/2007 | Lugg | ................. | F01D 5/03 |
| | | | | 310/11 |
| 2007/0231149 A1 | 10/2007 | Aynes et al. | | |
| 2012/0093637 A1 * | 4/2012 | Takahashi | ............. | F04D 29/324 |
| | | | | 415/208.1 |
| 2012/0210715 A1 * | 8/2012 | Shibata | ................ | F01D 5/141 |
| | | | | 60/670 |

\* cited by examiner

GAS TURBINE COMPRESSOR STATOR VANE ASSEMBLY

This claims the benefit of European Patent Application EP 13176499.5, filed Jul. 15, 2013 and hereby incorporated by reference herein.

The present invention relates to a stator vane assembly for a compressor of a gas turbine, in particular of an aircraft engine, a compressor having such a stator vane assembly, and a gas turbine having such a compressor.

BACKGROUND

United States Patent Application US 2005/0031454 A1, hereby incorporated by reference herein, describes a stator vane assembly having a plurality of stator vanes whose airfoil sections form a stagger angle with an axis of rotation. The stagger angle has a local minimum at both the airfoil root and the airfoil tip, and increases to a local maximum therebetween in order to improve the efficiency of the stator vane assembly.

SUMMARY OF THE INVENTION

However, this may flatten the stage characteristic and/or reduce the compressor stability and the surge margin.

It is an object of the present invention to provide an improved gas turbine.

The present invention provides that the airfoil sections are staggered to a more open configuration from a central region toward radially inner and outer duct walls and are then locally staggered to a more closed configuration near the radially inner and/or outer duct walls. In an embodiment, by such staggering in the central region, it is thus possible to reduce the degree of reaction more strongly in this region, and to thereby improve the compressor efficiency. Additionally or alternatively, local staggering to a more closed configuration in the region of one or both duct walls allows the flow to be aerodynamically increased in these regions, which makes it possible to improve the compressor stability, in particular to increase a surge margin.

In accordance with an aspect of the present invention, a stator vane assembly for a compressor of a gas turbine includes a plurality of stator vanes which may be detachably or permanently connected at the radially outer ends to a casing. Additionally or alternatively, the stator vanes may be connected at the radially inner ends to a hub or a shroud. It is equally possible for the stator vanes to have shroudless tips at the radially inner ends, with the shroudless tips facing a hub or a rotor of the compressor and being exposed to the fluid flow.

A stator vane is made up of, or defined by, a plurality of airfoil sections which are radially stacked along what is known as a "stacking axis" and together define a pressure side, a suction side, a leading edge, and a trailing edge of the stator vane, and which may, for example, be so-called NACA profiles.

Each airfoil section forms a stagger angle with the axis of rotation of the compressor and with a centerline, or axis of symmetry, of the stator vane assembly. The term "stagger angle", as used herein, is understood to refer in particular to the angle formed between the chord of an airfoil section and the axis. Therefore, it may be equivalent to the complementary angle to 90° of an angle which is formed between the chord and the circumferential direction or, respectively, a plane normal to the axis of rotation of the compressor and to the centerline, or axis of symmetry, of the stator vane assembly, and which, in a departure from the nomenclature used herein, is sometimes also referred to as stagger angle in the literature. The term "blade chord", as used herein, is understood to refer in particular to a line connecting an airfoil leading edge and an airfoil trailing edge.

In the context of the present invention, a "chord" may in particular also be the tangent (also known as "airfoil tangent") against the pressure side of the airfoil section.

In accordance with an aspect of the present invention, the stagger angle varies along the duct height in a radial direction from the inside to the outside in such a way that in a first, radially innermost section, it decreases from an initial value to an inner local minimum, that in an adjoining second section, it increases to a local maximum, and that in an adjoining third section, it decreases to an outer local minimum.

Additionally or alternatively to the decrease of the stagger angle in the first, radially innermost section, the stagger angle may increase along the duct height in a radial direction from the inside to the outside from the outer local minimum to a final value in a fourth, radially outermost section adjoining the third section.

Thus, in accordance with an aspect of the present invention, the stagger angle varies along the duct height in a radial direction from the inside to the outside between a radially innermost initial value and a radially outermost final value in such a way that in a first, radially innermost section, it decreases from the radially innermost initial value to an inner local minimum, in an adjoining second section, it increases to a local maximum, and in an adjoining third section, it decreases to an outer local minimum, a radially outermost fourth section may adjoin the third section.

In an embodiment, the outer local minimum may be located at the radially outer edge of the duct height or may also be radially inwardly spaced therefrom. Accordingly, in an embodiment, the radially outermost final value of the stagger angle may be equal to or greater than the outer local minimum.

In accordance with another aspect of the present invention, the stagger angle varies along the duct height in a radial direction from the inside to the outside between a radially innermost initial value and a radially outermost final value in such a way that in a second section adjoining the first, radially innermost section, it increases to a local maximum, in an adjoining third section, it decreases to an outer local minimum, and in a fourth, radially outermost section adjoining the third section, it increases from the outer local minimum to a radially outermost final value.

In an embodiment, the inner local minimum may be at the radially inner edge of the duct height or may also be radially outwardly spaced therefrom. Accordingly, in an embodiment, the radially innermost initial value may be equal to or greater than the inner local minimum.

These two aspects may be combined with each other. Accordingly, in accordance with an aspect of the present invention, the stagger angle varies along the duct height in a radial direction from the inside to the outside in such a way that in a first, radially innermost section, it decreases from a radially innermost initial value to an inner local minimum, that in an adjoining second section, it increases to a local maximum, that in an adjoining third section, it decreases to an outer local minimum, and that in an adjoining fourth, radially outermost section, it increases from the outer local minimum to a radially outermost final value. In an embodiment, this results in W-like curve for the stagger angle along or in the direction of the duct height.

In the context of the present invention, the term "duct height" is understood to refer in particular to a radial position between a radially inner airfoil end, in particular a hub, a free airfoil tip, or a shroud, and a radially outer airfoil end, in particular a duct wall of a flow duct in which the stator vane assembly is disposed. In the context of the present invention, the term "duct height" may in particular also refer to a radial position between two opposite duct walls which, together with the suction and pressure sides of the stator vane assembly, define a flow duct. In an embodiment, the first, radially innermost section begins at a radially inner duct wall, in particular a shroud, a hub, or a free airfoil tip. Additionally or alternatively, in an embodiment, the fourth, radially outermost section ends at a radially outer duct wall, in particular a casing of the compressor. Additionally or alternatively, the first, second, third and/or fourth section immediately adjoin each other.

In an embodiment, the stagger angle decreases monotonically in the first section. As is customary in the art, this is understood herein to mean that at a radially more outward position of the first section, the value of the stagger angle is always at most equal to the value at any radially more inward position of the first section. In another embodiment, the stagger angle decreases strictly monotonically in the first section. As is customary in the art, this is understood herein to mean that at a radially more outward position of the first section, the value of the stagger angle is always less than the value at any radially more inward position of the first section.

Additionally or alternatively, in an embodiment, the stagger angle decreases monotonically, in particular strictly monotonically, in the third section.

Additionally or alternatively, in an embodiment, the stagger angle increases monotonically in the second section. As is customary in the art, this is understood herein to mean that at a radially more outward position of the second section, the value of the stagger angle is always at least equal to the value at any radially more inward position of the second section. In another embodiment, the stagger angle increases strictly monotonically in the second section. As is customary in the art, this is understood herein to mean that at a radially more outward position of the second section, the value of the stagger angle is always greater than the value at any radially more inward position of the second section.

Additionally or alternatively, in an embodiment, the stagger angle increases monotonically, in particular strictly monotonically, in the fourth section.

In particular when the airfoil sections are locally staggered to a more closed configuration only near the radially inner duct wall or only near the radially outer duct wall, the stagger angle may, in one embodiment, increase monotonically, in particular strictly monotonically, also in the first section; i.e., the inner local minimum may be located at the radially inner edge of the duct height, or, in another embodiment, the stagger angle may decrease monotonically, in particular strictly monotonically, in the fourth section; i.e., the outer local minimum may be located at the radially outer edge of the duct height. In these cases, a first and a section and, respectively, a third and a fourth section, merge indistinguishably into one another.

This allows the stator vane assembly to be designed in an advantageous manner in terms of aerodynamics, strength, vibration and/or ease of manufacture.

In an embodiment, the local maximum is greater, in particular at least 2.5° greater, than the initial value. Additionally or alternatively, the local maximum may be no more than 7° greater than the initial value.

Additionally or alternatively, the local maximum is greater, in particular at least 2.5° greater, than the final value. Additionally or alternatively, the local maximum may be no more than 7° greater than the final value. Thus, the local maximum may in particular be a global maximum along the duct height. This is particularly advantageous to reduce the degree of reaction more strongly in the second and third sections, while at the same time raising the surge line and increasing the compressor stability.

In an embodiment, the initial value is smaller, in particular at least 1° smaller, than the final value. Additionally or alternatively, the initial value may be no more than 5° smaller than the final value.

It proved advantageous that the staggering of the profile sections to a more open configuration be more pronounced in the radially inner region.

In an embodiment, the initial value is at least 1° greater than the inner local minimum. Additionally or alternatively, the initial value may be no more than 2.5° greater than the inner local minimum. Additionally or alternatively, the final value may be at least 1° greater than the outer local minimum. Additionally or alternatively, the final value may be no more than 2.5° greater than the outer local minimum. Local staggering to the more closed configurations indicated above proved to be particularly advantageous.

In an embodiment, the local maximum is at least 3.5° greater than the inner local minimum. Additionally or alternatively, the local maximum may be no more than 9.5° greater than the inner local minimum. Additionally or alternatively, the local maximum may be at least 3.5° greater than the outer local minimum. Additionally or alternatively, the local maximum may be no more than 9.5° greater than the outer local minimum. This is an advantageous combination of reducing the degree of reaction in the second and third sections and raising the surge line and increasing the compressor stability.

In an embodiment, the height of the first section is at least 3% of the total duct height between the initial value and the final value. Additionally or alternatively, the height of the first section is no more than 25% of the total duct height between the initial value and the final value. Additionally or alternatively, the height of the fourth section may be at least 3% of the total duct height between the initial value and the final value and/or no more than 25% of the total duct height between the initial value and the final value. These values are sufficient to advantageously raise the surge line and increase the compressor stability.

In an embodiment, the local maximum is located between 25% and 75% of the total duct height between the initial value and the final value. Additionally or alternatively, the height of the second section may be at least 15% of the total duct height between the initial value and the final value and/or no more than 55% of the total duct height between the initial value and the final value. Additionally or alternatively, the height of the third section may be at least 15% of the total duct height between the initial value and the final value and/or no more than 55% of the total duct height between the initial value and the final value. These values are sufficient to advantageously reduce the degree of reaction in the second and third sections.

In an embodiment, the leading edges of one or more stator vanes, in particular of all stator vanes, are curved toward a suction side of the stator vane. In another embodiment, the leading edges are curved strictly convexly toward the suction side. As is customary in the art, this is understood to mean that the curvature of the leading edge along the duct height is always of the same sign, and preferably increases or decreases strictly monotonically in a radial direction from the inside to the outside.

A stator vane assembly according to the present invention is particularly advantageously used as a downstream stator vane assembly or a downstream compressor stage in a compressor for a gas turbine, and a compressor according to the present invention is particularly advantageously used as a high-pressure compressor disposed downstream of a low- or medium-pressure compressor, or as a downstream compressor, for a gas turbine. The stator vane assembly is particularly advantageously used in an aircraft engine gas turbine.

BRIEF DESCRIPTION OF THE DRAWINGS

Further advantageous features of the present invention will be apparent from the dependent claims and the following description of preferred embodiments. To this end, the drawings show, partly in schematic form, in:

DETAILED DESCRIPTION

Figure 1:
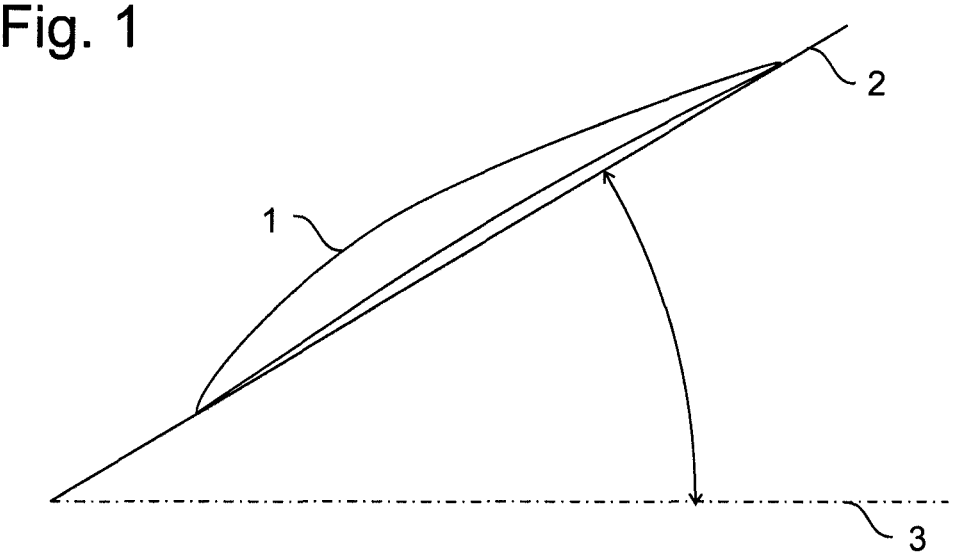
FIG. 1: an airfoil section of a stator vane of a stator vane assembly of a compressor of a gas turbine according to an embodiment of the present invention; and in FIG. 2: the curve of a stagger angle of the stator vane of FIG. 1 as a function of a duct height.
Figure 3:
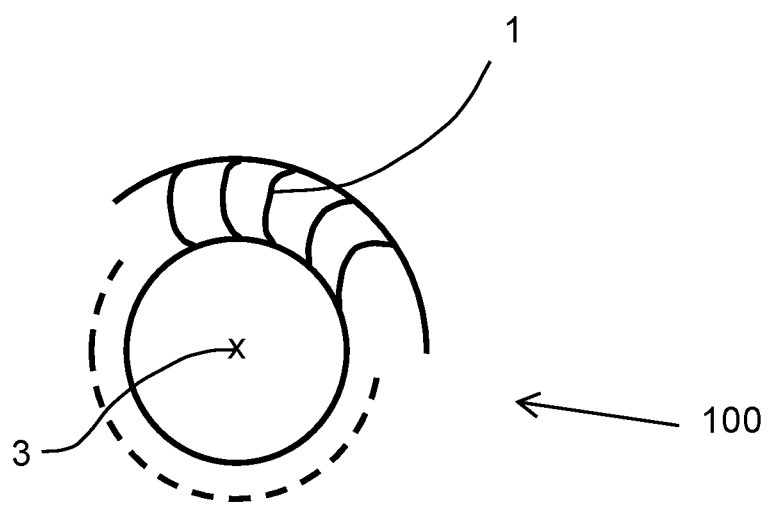
FIG. 3 shows schematically a stator vane assembly 100 with leading edges curved strictly convexly toward a suction side.

FIG. 1 shows an airfoil section 1 of a stator vane of a stator vane assembly 100 (See FIG. 3) of a compressor of a gas turbine according to an embodiment of the present invention, where a chord 2 forms a stagger angle $\beta$ with an axis of rotation 3 of the compressor.

Figure 2:
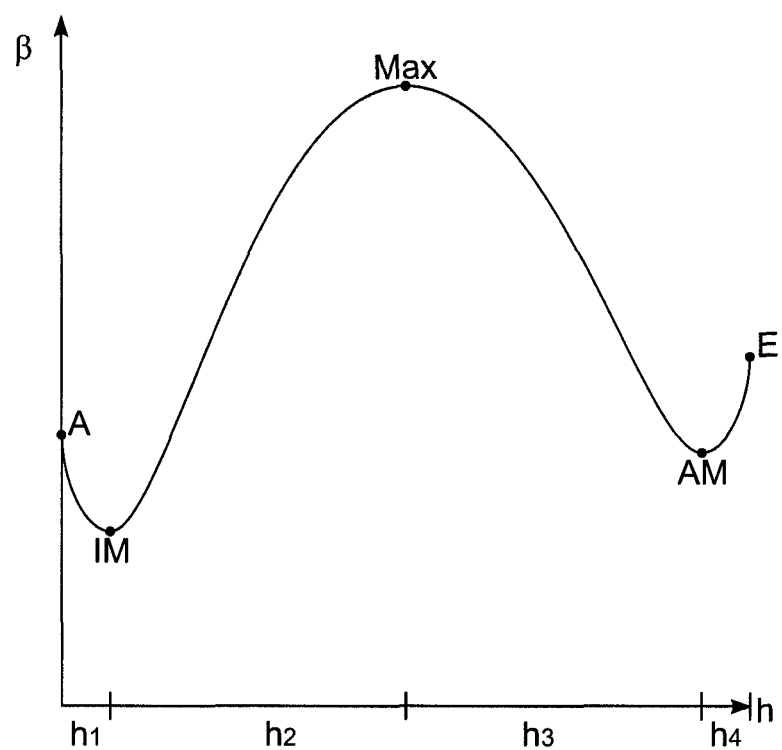

FIG. 2 shows the curve of the stagger angle $\beta$ of the stator vane of FIG. 1 as a function of a duct height h.

Stagger angle $\beta$ varies along duct height h in a radial direction from the inside to the outside (from left to right in FIG. 2) in such a way that in a first, radially innermost section $h_1$, it decreases strictly monotonically from an initial value A to an inner local minimum IM, that in an adjoining second section $h_2$, it increases strictly monotonically to a local maximum Max, that in an adjoining third section $h_3$, it decreases strictly monotonically to an outer local minimum AM, and that in an adjoining fourth, radially outermost section $h_4$, it increases strictly monotonically from the outer local minimum to a final value E.

Local maximum Max is 3.8° greater than initial value A and 5.7° greater than final value E. Initial value A is 1.9° greater than final value E. Initial value A is 1.4° greater than inner local minimum IM, and final value E is 1.4° greater than outer local minimum AM. Local maximum Max is 5.2° greater than inner local minimum IM and 7.1° greater than outer local minimum AM. The heights of the first and fourth sections are each 7% of the total duct height, and the heights of the second and third sections are each 43%, so that the local maximum is located at 50% of the total duct height.

Although the above is a description of exemplary embodiments, it should be noted that many modifications are possible. It should also be appreciated that the exemplary embodiments are only examples, and are not intended to limit scope, applicability, or configuration in any way. Rather, the foregoing description provides those skilled in the art with a convenient road map for implementing at least one exemplary embodiment, it being understood that various changes may be made in the function and arrangement of elements described without departing from the scope of protection set forth in the appended claims and their equivalent combinations of features.

LIST OF REFERENCE NUMERALS 1 airfoil section
2 chord
3 axis of rotation
$\beta$ stagger angle
h duct height
$h_{1/2/3/4}$ first/second/third/fourth section
A initial value
E final value
IM inner local minimum
AM outer local minimum
Max local maximum

What is claimed is:

1. A stator vane assembly for a compressor of a gas turbine comprising:
a plurality of stator vanes whose airfoil sections form a stagger angle with an axis of rotation of the compressor, the stagger angle varying along a duct height of the stator vane assembly,
wherein along the duct height between a radially innermost initial value and a radially outermost final value, the stagger angle increases to a local maximum in a second section adjoining a first, radially innermost section, and decreases to an outer local minimum in a third section adjoining said second section, and
wherein, along the duct height from the inside to the outside, the stagger angle decreases from the initial value to an inner local minimum in the first, radially innermost section or increases from the outer local minimum to the final value in a fourth, radially outermost section adjoining the third section.

2. The stator vane assembly as recited in claim 1 wherein the stagger angle decreases monotonically in the first or third section or increases monotonically in the second or fourth section.

3. The stator vane assembly as recited in claim 2 wherein the monotonical decrease or increase is strictly monotonical.

4. The stator vane assembly as recited in claim 1 wherein the local maximum is greater than the initial value or the final value.

5. The stator vane assembly as recited in claim 4 wherein the local maximum is at least 2.5° and no more than 7°.

6. The stator vane assembly as recited in claim 1 wherein the initial value is smaller than the final value.

7. The stator vane assembly as recited in claim 1 wherein the initial value is at least 1° and no more than 5° smaller than the final value.

8. The stator vane assembly as recited in claim 1 wherein the initial value is at least 1° and no more than 2.5° greater than the inner local minimum or the final value is at least 1° and no more than 2.5° greater than the outer local minimum.

9. The stator vane assembly as recited in claim 1 wherein the local maximum is at least 3.5° and no more than 9.5° greater than the inner or outer local minimum.

10. The stator vane assembly as recited in claim 1 wherein the height of the first or fourth section is at least 3% and no more than 25% of the total duct height between the initial value and the final value.

11. The stator vane assembly as recited in claim 1 wherein the local maximum is located between 25% and 75% of the total duct height between the initial value and the final value.

12. The stator vane assembly as recited in claim 1 wherein the leading edge of at least one of the stator vanes is curved toward a suction side of the stator vane.

13. The stator vane assembly as recited in claim 12 wherein the leading edge is strictly convexly curved.

14. An aircraft engine comprising the stator vane assembly as recited in claim 1.

15. A compressor for a gas turbine comprising: at least one stator vane assembly as recited in claim 1.

16. The compressor as recited in claim 15 wherein the stator vane assembly is a downstream stator vane assembly.

17. An aircraft engine comprising the compressor as recited in claim 15.

18. A gas turbine comprising the compressor as recited in claim 15.

19. The gas turbine as recited in claim 18 wherein the compressor is a downstream compressor.

20. An aircraft engine comprising the gas turbine as recited in claim 18.

21. The stator vane assembly as recited in claim 1 wherein, along the duct height from the inside to the outside, the stagger angle decreases from the initial value to the inner local minimum in the first, radially innermost section.

\* \* \* \* \*